E. A. MUCKEY.
INSULATOR ASSEMBLAGE FOR ELECTRIC CONSTRUCTION.
APPLICATION FILED AUG. 23, 1917.
1,257,516.
Patented Feb. 26, 1918.
2 SHEETS—SHEET 1.
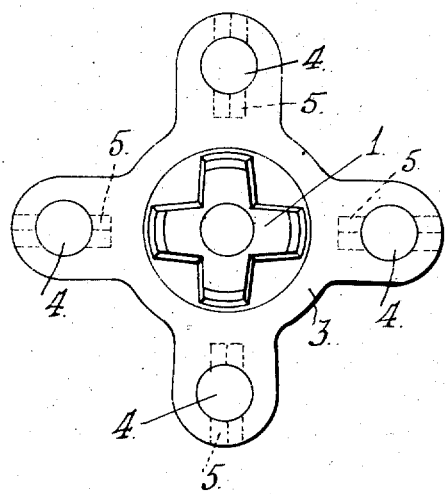
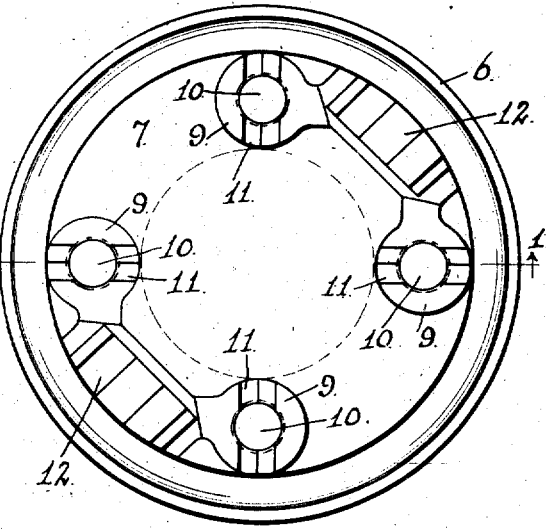
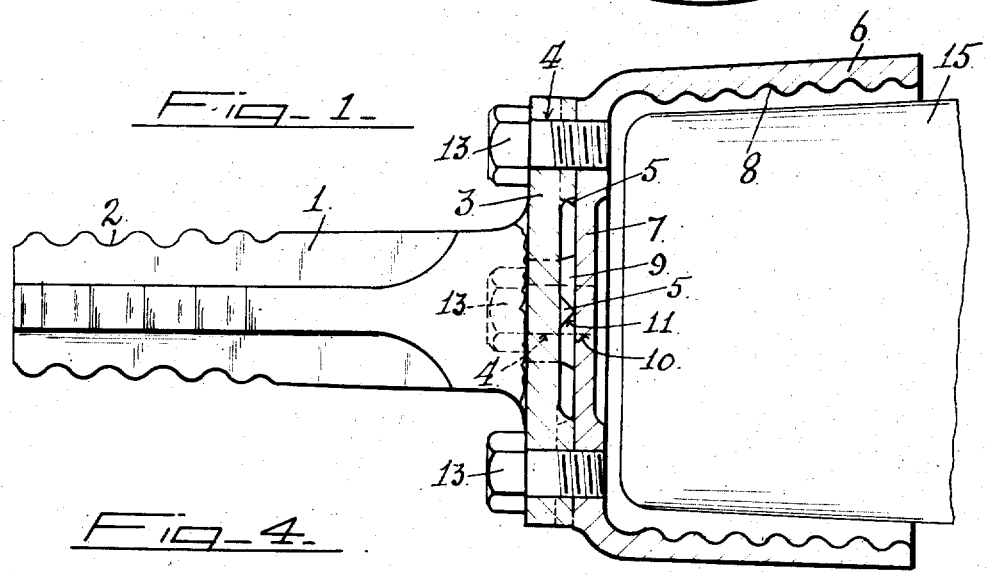
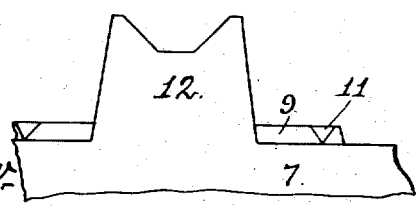
WITNESS:
W. F. Drew
INVENTOR.
Earle A. Muckey
BY
Booth & Booth
ATTORNEYS.

E. A. MUCKEY.
INSULATOR ASSEMBLAGE FOR ELECTRIC CONSTRUCTION.
APPLICATION FILED AUG. 23, 1917.
1,257,516.
Patented Feb. 26, 1918.
2 SHEETS—SHEET 2.
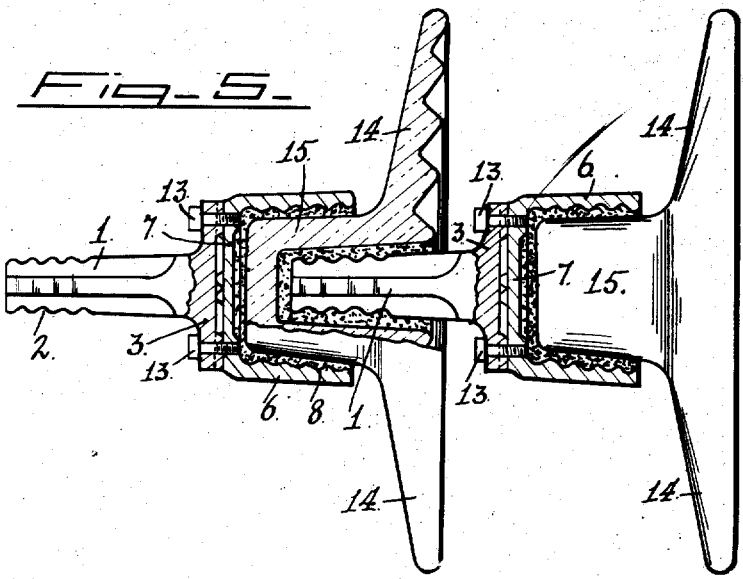
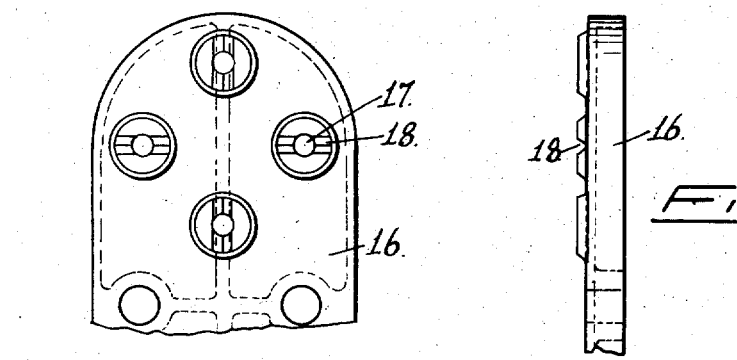
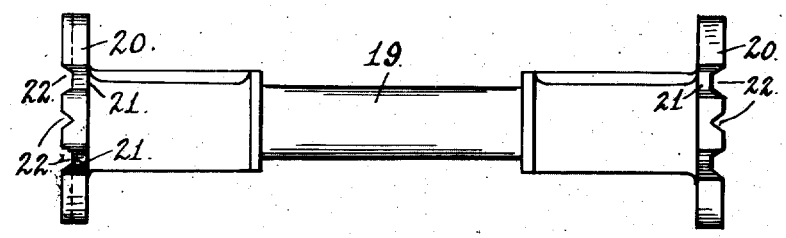
WITNESS:
Wm F Drew
INVENTOR.
Earle A. Muckey
BY
Booth & Booth
ATTORNEYS.

UNITED STATES PATENT OFFICE.

EARLE A. MUCKEY, OF SAN FRANCISCO, CALIFORNIA, ASSIGNOR OF ONE-HALF TO EDWIN W. BEARDSLEY, OF SAN FRANCISCO, CALIFORNIA.

INSULATOR ASSEMBLAGE FOR ELECTRIC CONSTRUCTION.

1,257,516.   Specification of Letters Patent.   Patented Feb. 26, 1918.

Application filed August 23, 1917. Serial No. 187,832.

*To all whom it may concern:*

Be it known that I, EARLE A. MUCKEY, a citizen of the United States, residing at the city and county of San Francisco and State of California, have invented certain new and useful Improvements in Insulator Assemblage for Electric Construction, of which the following is a specification.

My invention relates, in general, to electric-construction, and, in particular, to the assemblage of insulators in various devices and structures, such for example as disconnecting switches, main-line switches both inside and outside construction, bus-bar construction, insulation for lines on pole or tower construction, and any form of wiring.

My invention consists essentially in the novel means, which, as will be shown, may properly be termed universal hardware, for detachably connecting the insulators either singly, or in units of plural members to various structural elements, and for detachably connecting a plurality of insulators into units of any required voltage.

These means comprise a novel insulator bell and a novel insulator pin each adapted for ready and universal detachable rigid connection to each other and to whatever structural element to which they are to be applied, all as I shall now fully describe by reference to the accompanying drawings, in which—

Figure 1 is an elevation of the insulator pin connected by its base flange to the cap or head of the insulator bell, which latter is in section on the line 1—1, of Fig. 3.

Fig. 2 is a top-plan view of the insulator pin.

Fig. 3 is a top plan view of the insulator bell.

Fig. 4 is a side view of one of the lugs on the cap or head of the insulator bell.

Fig. 5 is a longitudinal section of a plural insulator unit compounded by means of the pins and bells.

Fig. 6 is a front elevation of a bearing base to which an insulator pin of the assemblage may be applied.

Fig. 7 is a side elevation of the same.

Fig. 8 is a side elevation of a rotary member or shaft of a switch structure, to which the insulator pin may be applied.

1 is the insulator pin having any suitable cross sectional form, as, for example, the angle-ribbed shape shown. The pin is circumferentially roughened or corrugated, as shown at 2, to hold the cement by which it is united to an insulator disk. The foot of the pin is formed with a flange base 3, through the wings of which are made holes 4 for bolts, and said base is also formed with V-tongues 5 traversing the holes.

6 is the insulator bell, with an integral head or cap 7. The interior of the bell is circumferentially roughened or corrugated as shown at 8, to hold the cement by which it is united to the shank of an insulator disk. The upper surface of the cap 7 of the bell is formed with bosses 9 through which are bolt holes 10, and across which are formed V-grooves 11. The upper surface of the cap is also formed with V-grooved lugs 12, as shown in Figs. 3 and 4, for a purpose to be presently described.

The pin 1 and the bell 6 are detachably connected, as shown in Fig. 1, by the bolts 13, through the holes 4 and 10 of the base flange of the pin and the head of the bell, respectively. In this assemblage the V-tongues 5 of the pin base fit the V-grooves 11 of the bell head, and resist shearing or twisting strains.

By referring now to Fig. 5, it will be seen how the pins and bells are assembled in a plural insulator unit. In this figure, 14 are the usual insulator disks. Into the body of one disk is cemented the pin 1, while the shank 15 of the same disk is cemented in the bell 6 next adjacent.

By removing the bolts 13, the disks may be readily separated, or they may be compounded to any voltage required. Fresh disks may be added to replace injured or defective ones.

In Figs. 6 and 7, I show a bearing base 16 which is formed with holes 17 and V-grooves 18, adapted for the connection of an insulator pin such as 1, and by consequence, of any assemblage of insulators of which said pin forms a part.

In Fig. 8 I show a shaft 19 which may represent the rotatable member of a disconnecting switch. This shaft has end flanges 20 formed with holes 21 and V-grooves 22, adapting it to receive an insulator pin such as 1, and its assemblage of disks.

It will now be seen that the essential elements, namely the pin 1, and the bell 6, are practically universal, and may be used in a variety of structures. They yield advantages, such as the replacement of disks in case of injury to any one or more of the disks, without loss of the entire unit; they reduce the assemblage to a minimum number of parts, are interchangeable, and give a standard for any combination; they give opportunity for repairs, due to breakage from any cause, such as line surges, atmospheric changes, vandalism, or defects in material which show up in service; they make a rigid unit, which on this account enables it to be supported from a base, either vertically or horizontally or at any angle, as well as being suspended; they provide for the ready and economical increase and decrease of line voltages, and finally, they give opportunity for supplying the exact requirements of any given condition, without having to carry in stock a variety of assemblages to meet such conditions.

The purpose of the V-groove lugs 12 on the cap or head of the bell 6, is to provide the terminal bell with a seat for the attachment of any element, such as a switch blade, or a bar or pipe or tube or other terminal for any purpose, according to the structure.

I claim:—

1. An insulator-assemblage for electric-construction, comprising an insulator pin having a base flange; a member to which the base flange of the pin is bolted, the meeting surfaces of the base flange of said pin and said member being provided with interfitting tongues and grooves; and an insulator disk carried by the pin.

2. In an insulator-assemblage for electric construction, the combination of an insulator pin having a base-flange; and an insulator bell to the head of which the base flange of the pin is bolted.

3. In an insulator-assemblange for electric-construction, the combination of an insulator pin having a base flange; and an insulator bell to the head of which the base flange of the pin is bolted, the meeting surfaces of the base flange of the pin and bell head being provided with interfitting tongues and grooves.

4. An insulator-assemblage for electric-construction, comprising an insulator pin having a base flange; an insulator bell to the head of which the base flange of the pin is bolted; and an insulator disk adapted for connection with the insulator pin and having a shank fitted in the cavity of the bell.

5. An insulator-assemblage for electric-construction, comprising an insulator pin having a base-flange; an insulator bell to the head of which the base flange of the pin is bolted, the meeting surfaces of the base flange of the pin and bell head being provided with interfitting tongues and grooves; and an insulator disk adapted for connection with an insulator pin and having a shank fitted in the cavity of the bell.

6. An insulator-assemblage for electric-construction, comprising an insulator pin having a base flange; a member to which the base flange of the pin is bolted; an insulator-disk fitted on the pin, said disk having a shank; an insulator bell into which the shank of the disk is fitted, said bell having a head; and a second insulator pin having a base flange bolted to the head of the bell.

7. An insulator-assemblage for electric-construction, comprising an insulator pin having a base flange; a member to which the base flange of the pin is bolted, the meeting surfaces of the base flange of said pin and member being provided with interfitting tongues and grooves; an insulator disk fitted on the pin, said disk having a shank; an insulator bell into which the shank of the disk is fitted, said bell having a head; and a second insulator pin having a base flange bolted to the head of the bell, the meeting surfaces of the base flange of the pin and the head of the bell being provided with interfitting tongues and grooves.

8. In an insulator-assemblage for electric-construction, the combination of an insulator pin having a base flange; and an insulator bell to the head of which the base flange of the pin is bolted, said bell head being provided with seat-lugs for a terminal member.

9. In an insulator-assemblage for electric-construction, the combination of an insulator pin having a base flange; and an insulator bell to the head of which the base flange of the pin is bolted; the meeting surfaces of the base flange of the pin and the bell head being provided with interfitting tongues and grooves, and said bell head being also provided with seat lugs for a terminal member.

In testimony whereof I have signed my name to this specification in the presence of two subscribing witnesses.

EARLE A. MUCKEY.

Witnesses:
WM. F. BOOTH,
D. B. RICHARDS.